US012739463B2

(12) United States Patent
Ahmed et al.

(10) Patent No.: US 12,739,463 B2
(45) Date of Patent: Sep. 15, 2026

(54) DYNAMIC OUTPUT OF CONTENT BASED ON DETECTION OF INTENDED OR UNINTENDED AUDIO

(71) Applicant: DISH Network Technologies India Private Limited, Bangalore (IN)

(72) Inventors: Mansoor Ahmed, Bengaluru (IN); PrasannaKumar L, Bangalore (IN); Visali Manoharan, Chennai (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 0 days.

(21) Appl. No.: 18/975,791

(22) Filed: Dec. 10, 2024

(65) Prior Publication Data

US 2026/0164078 A1 Jun. 11, 2026

(51) Int. Cl.

*H04N 21/422* (2011.01)
*H04N 21/439* (2011.01)
*H04N 21/431* (2011.01)

(52) U.S. Cl.

CPC ... *H04N 21/42203* (2013.01); *H04N 21/4316* (2013.01); *H04N 21/4396* (2013.01)

(58) Field of Classification Search

None
See application file for complete search history.

(56) References Cited

U.S. PATENT DOCUMENTS 6,246,443 B1 * 6/2001 Van Gestel .............. H04N 5/44 348/706
6,370,254 B1 * 4/2002 Gore ........................ H04N 5/60 348/E5.122
8,041,025 B2 * 10/2011 Dolph ............ H04N 21/440236 381/94.1
10,841,698 B1 * 11/2020 Janampally ............. G10L 25/51
2006/0069548 A1 * 3/2006 Matsuura ......... H04N 21/42203 704/E21.019
2006/0230421 A1 * 10/2006 Pierce ...................... H04N 5/76 725/141
2007/0127879 A1 * 6/2007 Frank ................. H04N 21/4223 348/E5.002

(Continued)

FOREIGN PATENT DOCUMENTS

CN 115278353 A * 11/2022 ........... H04N 21/439
WO WO-2017007843 A1 * 1/2017 ............. G06F 3/165

*Primary Examiner* — William J Kim
(74) *Attorney, Agent, or Firm* — Seed Intellectual Property Law Group LLP

(57) ABSTRACT

Systems and methods for a content receiver to dynamically determine if an audio signal includes intended audio or unintended audio based on a comparison between the audio signal and a plurality of intended-audio signatures or a plurality of unintended-audio signatures, or both. In response to determining that the audio signal includes unintended audio, the content receiver may output content based on an unintended-audio action. And in response to determining that the audio signal includes intended audio, the content receiver may: determine an intended-audio profile associated with the intended-signature that matches the audio signal; determines an intended-audio action based on the determined intended-audio profile; and outputs the content based on the intended-audio action.

20 Claims, 4 Drawing Sheets

(56) References Cited

U.S. PATENT DOCUMENTS

| | | | | |
|---|---|---|---|---|
| 2008/0134278 | A1* | 6/2008 | Al-Karmi | H04L 12/2834 455/556.1 |
| 2013/0345840 | A1* | 12/2013 | Lempel | G06F 16/683 700/94 |
| 2016/0198229 | A1* | 7/2016 | Keipert | H04N 21/47217 725/12 |
| 2016/0306797 | A1* | 10/2016 | Taboriskiy | G06F 16/433 |
| 2016/0316271 | A1* | 10/2016 | Hajiyev | H04N 21/44245 |
| 2017/0111595 | A1* | 4/2017 | Soni | G06V 20/41 |
| 2017/0181095 | A1* | 6/2017 | Guennec | G06F 9/5011 |
| 2018/0332340 | A1* | 11/2018 | Ogle | H04N 21/4131 |
| 2021/0099829 | A1* | 4/2021 | Soto | H04R 27/00 |

* cited by examiner

DYNAMIC OUTPUT OF CONTENT BASED ON DETECTION OF INTENDED OR UNINTENDED AUDIO

BACKGROUND

People watch television in a variety of conditions, including different locations and times. These conditions can impact the viewing experience in a variety of different ways. One such difficulty can be in hearing the television when there are people talking near the television. Another difficulty can be in paying attention to other situations when engaged with the television. It is with respect to these and other considerations that the embodiments described herein have been made.

BRIEF SUMMARY

Embodiments are directed to the dynamic output of content by a content receiver based on the determination or detection of unintended audio or intended audio. For example, a system may comprise an audio capturing device and a content receiver. The audio capturing device may be internal to the content receiver or external to (or remote from) the content receiver. The audio capturing device is configured to capture an audio signal. The audio signal may be an unintended audio signal (e.g., people talking) or an intended audio signal (e.g., audio of a baby crying or a signal from a doorbell indicating that the doorbell has been activated). The content receiver may be configured to: receive content for presentation to a user of the content receiver; and determine whether the audio signal includes intended audio or unintended audio based on a comparison between the audio signal and intended-audio signatures of a plurality of intended-audio profiles. The audio signal may include unintended audio in response to failing to identify a match between the audio signal and an intended-audio signature. And the audio signal may include intended audio in response to identifying a match between the audio signal and an intended-audio signature in an intended-audio profile. In response to determining that the audio signal includes unintended audio, the content receiver may output the content based on an unintended-audio action. And in response to determining that the audio signal includes intended audio, the content receiver may: determine an intended-audio action based on an intended-audio profile associated with the intended-audio signature that matches the audio signal; and output the content based on the intended-audio action.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
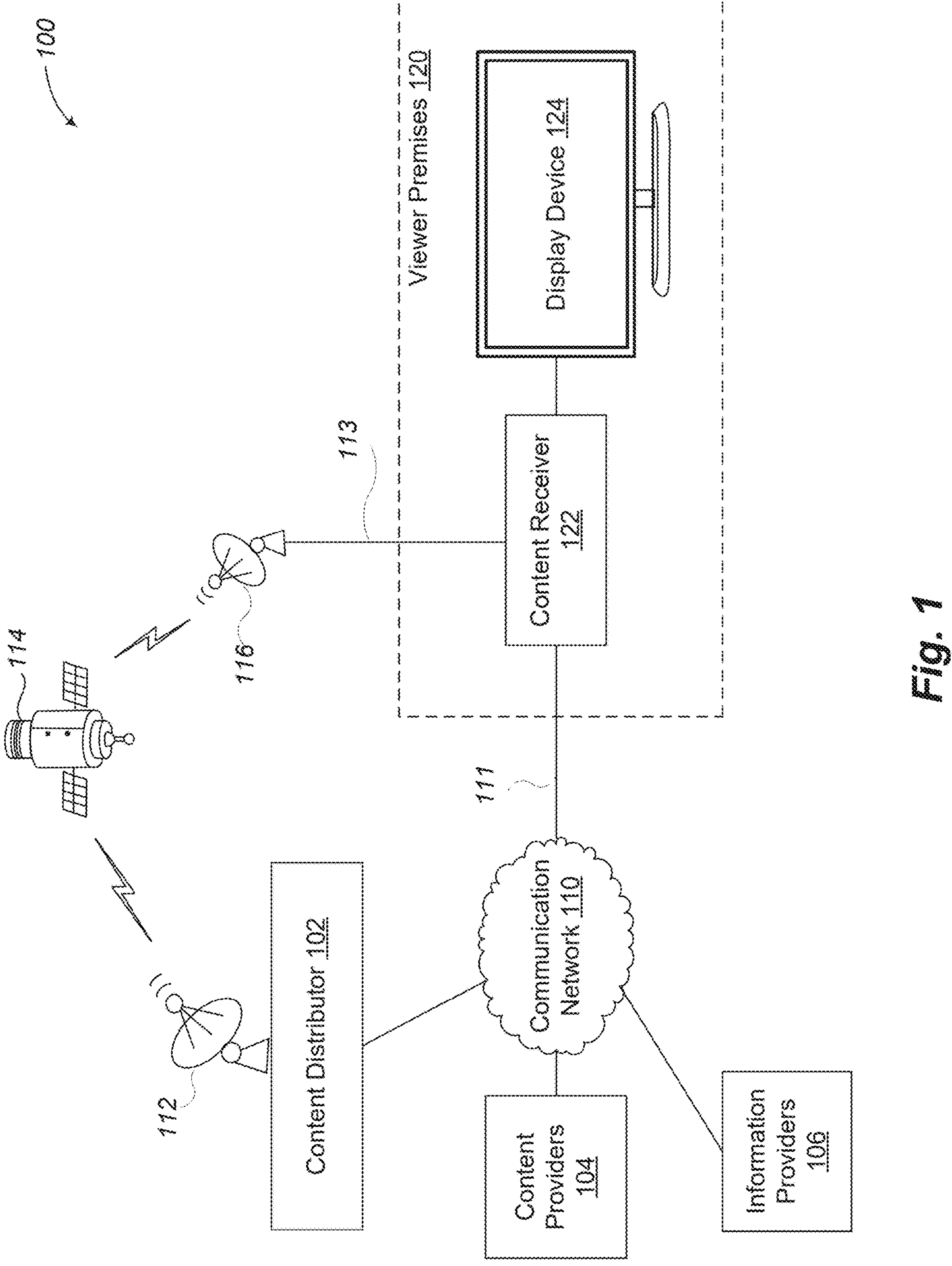
FIG. 1 illustrates a context diagram of an environment for dynamically selecting an action for a content receiver based on receipt of intended or unintended audio in accordance with embodiments described herein.

FIG. 1 illustrates a context diagram of an environment 100 for dynamically selecting an action for a content receiver based on receipt of intended or unintended audio in accordance with embodiments described herein. Environment 100 includes content providers 104, information providers 106, content distributor 102, communication network 110, and viewer premises 120.

Viewer premises 120 includes a content receiver 122 and a display device 124. The content receiver 122 is a computing device that receives content for presentation on the display device 124 to a viewer on the viewer premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device. In some embodiments, the content receiver 122 and the display device 124 may be integrated into a single computing device, such as the viewer's desktop computer, laptop computer, smart phone, tablet computer, etc. Accordingly, the content receiver 122 and the display device 124 may not be limited to the viewer premises 120 in some embodiments. In some embodiments, the viewer premises 120 may also include an audio output device (not illustrated) that is separate from the display device 124. For convenience of discussion, the content receiver 122 is described herein as outputting content via the display device 124 in accordance with intended-audio actions or unintended-audio actions, which may include outputting an audio component of the content via the display device or via a separate audio output device, or both.

In various embodiments, the content receiver 122 may store a plurality of intended-audio profiles for one or more users. As described herein, the content receiver 122 may receive an audio signal from one or more audio capturing devices and analyze the audio signal for intended audio defined by the plurality of intended-audio profiles, or in some embodiments, unintended audio defined by a plurality of unintended-audio profiles. If an intended audio or noise is identified or detected in the audio signal, then the content receiver 122 may output content (e.g., via the display device 124) based on an intended-audio action associated with that intended audio. But in an unintended audio or noise is identified or detected in the audio signal, then the content receiver 122 may output content (e.g., via the display device 124) based on an unintended-audio action.

The following briefly discusses additional components in example environment 100. In various embodiments, the content distributor 102 provides content to the content receiver 122. The content distributor 102 may receive a plurality of different content from one or more content providers 104, one or more information providers 106, or a combination thereof. The content distributor 102 provides content and supplemental content, whether obtained from content provider 104 or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks, which may include cellular networks.

Figure 2:
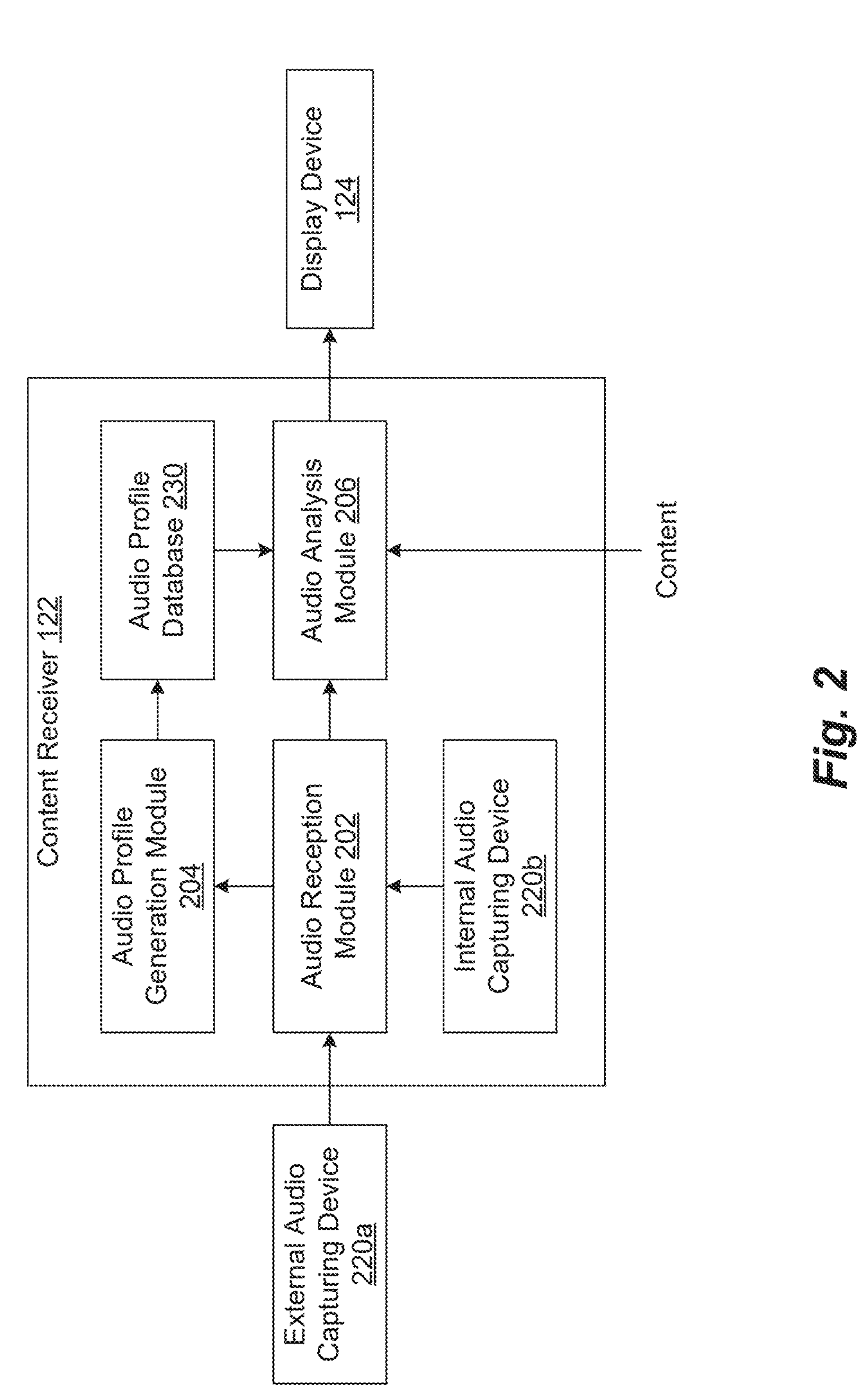
FIG. 2 shows a block diagram of a system for dynamically selecting an action for a content receiver based on receipt of intended or unintended audio in accordance with embodiments described herein.

FIG. 2 shows a block diagram of a system 200 for dynamically selecting an action for a content receiver based on receipt of intended or unintended audio in accordance with embodiments described herein. Example system 200 includes a content receiver 122 and display device 124, similar to what is illustrated in FIG. 1.

System 200 also includes an external audio capturing device 220*a*, an internal audio capturing device 220*b*, or both. The external audio capturing device 220*a* is a device or system configured to capture or obtain an audio signal, where the external audio capturing device 220*a* is separate, remote, or independent from the content receiver 122. In some embodiments, the external audio capturing device 220*a* may be optional and may not be included in system 200, such as if the content receiver 122 includes an internal audio capturing device 220*b*. In some embodiments, the content receiver 122 may include an internal audio capturing device 220*b*. The internal audio capturing device 220*b* is configured to capture or obtain an audio signal, where the internal audio capturing device 220*b* is embedded in, attached to, or otherwise included with the content receiver 122. In some embodiments, the internal audio capturing device 220*b* may be optional and may not be included in the content receiver 122, such as when the content receiver 122 receives audio signals from the external audio capturing device 220*a*.

Although system 200 shows a single external audio capturing device 220*a* and a single internal audio capturing device 220*b*, embodiments are not so limited. Rather, system 200 may include a single external audio capturing device 220*a*, a plurality of external audio capturing device s 220*a*, a single internal audio capturing device 220*b*, a plurality of internal audio capturing devices 220*b*, or a combination thereof.

The external audio capturing device 220*a* and the internal audio capturing device 220*b* may be collectively or individually referred to as an audio capturing device 220. In this way, system 200 may be generically referred to as including an audio capturing device 220. In some embodiments, the audio capturing device 220 is or includes a microphone that captures audio signals, such that the audio capturing device 220 generates the audio signal from the captured audio signals.

The content receiver 122 includes an audio reception module 202, an audio profile generation module 204, an audio analysis module 206, and an audio profile database 230.

The audio profile database 230 is a data structure that stores or maintains a plurality of audio profiles. In some embodiments, the plurality of audio profiles includes a plurality of intended-audio profiles. Each separate intended-audio profile includes a corresponding intended-audio signature and a corresponding intended-audio action. The intended-audio signature for a particular intended-audio profile is a representation of an audio signal for a selected, generated, or predefined intended audio. The intended-audio signature may be a sound waveform, sound characteristics, value, phrase, or other stored indicator of an intended audio. And the intended-audio action for a particular intended-audio profile is the action the content receiver 122 is to take in response to identifying the intended audio for that profile in the audio signal. Examples of intended-audio actions may include, but are not limited to, increasing content output volume, muting content output, pausing content output or playback, overlaying other content or icons or text on the content being output, generating a picture-in-picture with content from an audio capturing device, etc., or some combination thereof.

In some other embodiments, the plurality of audio profiles may include a plurality of unintended-audio profiles. Each separate unintended-audio profile includes a corresponding unintended-audio signature and a corresponding unintended-audio action. The unintended-audio signature for a particular unintended-audio profile is a representation of an audio signal for a selected, generated, or predefined unintended audio. The unintended-audio signature may be a sound waveform, sound characteristics, value, phrase, or other stored indicator of an unintended audio. And the unintended-audio action for a particular unintended-audio profile is the action the content receiver 122 is to take in response to identifying the unintended audio for that profile in the audio signal. Examples of unintended-audio actions may include, but are not limited to, increasing content output volume, recording content, pausing content output or playback, etc., or some combination thereof.

In some embodiments, one or more profiles in the audio profile database 230 are pre-stored or defined within the content receiver 122. In other embodiments, an administrator system or backend computing environment may provide (periodically, at select times, or when the content receiver is updated) one or more profiles to the content receive 122 for storage in the audio profile database 230. In yet other embodiments, one or more profiles in the audio profile database 230 may be generated by the audio profile generation module 204.

The audio reception module 202 is configured to receive an audio signal from the external audio capturing device 220*a* or the internal audio capturing device 220*b*, or both. In various embodiments, the audio reception module 202 may be configured to perform pre-processing on the audio signal prior to providing it to the audio analysis module 206 or the audio profile generation module 204. Examples of such pre-processing may include, but are not limited to, filtering (e.g., to accept select audio signals from select audio capturing device), prioritization (e.g., prioritize audio signals from one or more audio capturing devices over audio signals from one or more other audio capture devices), etc. The audio reception module 202 is configured to provide the audio signal to the audio analysis module 206.

The audio analysis module 206 is configured to receive audio signals from the audio reception module 202 and to analyze the audio signals for intended or unintended audio. In various embodiments, the audio analysis module 206 accesses the audio profile database 230 and compares the audio signal against intended-audio signatures in each intended-audio profile that is stored in the audio profile database 230. If there is a match between the audio signal and an intended-audio signature, then the audio analysis module 206 obtains the corresponding intended-audio action from the intended-audio profile that includes the matched intended-audio signature. The audio analysis module 206 then outputs or provides the received content to the display device 124 in accordance with the intended-audio action. In some embodiments, the audio analysis module 206 may cause the content receiver 122 to perform some other action not associated with the content in accordance with the intended-audio action (e.g., to turn of the display device 124).

In some embodiments, the audio analysis module 206 may be configured to analyze the audio signals for one or more unintended-audio signatures. In various embodiments, the audio analysis module 206 accesses the audio profile database 230 and compares the audio signal against unintended-audio signatures in each unintended-audio profile stored in the audio profile database 230. If there is a match between the audio signal and an unintended-audio signature, then the audio analysis module 206 obtains the corresponding unintended-audio action from the unintended-audio profile that includes the matched unintended-audio signature. The audio analysis module 206 then outputs or provides the received content to the display device 124 in accordance with the unintended-audio action. In some embodiments, the audio analysis module 206 may cause the content receiver 122 to perform some other action not associated with the content in accordance with the unintended-audio action (e.g., to record the content).

In some embodiments, the audio reception module 202 may also provide the audio signal to the audio profile generation module 204. In some embodiments, the content receiver 122 may be put into a dedicated audio profile learning mode. In the dedicated audio profile learning mode, the audio reception module 202 provides the audio signal only to the audio profile generation module 204. In this way, the user can "teach" an intended audio or an unintended audio to the content receiver. In other embodiments, the content receiver 122 may be put into a dynamic audio profile learning mode. In the dynamic audio profile learning mode, if the audio analysis module 206 receives an audio signal, then the user of the content receiver 122 may be prompted via a graphical user interface to select the learning mode or not. If the user selects the learning mode, then the audio reception module 202 may provide the audio signal to the audio profile generation module 204. In various embodiments, the content receiver 122 may be put into the dedicated audio profile learning mode or the dynamic audio profile learning mode in response to the user selecting such as mode in a graphical user interface menu.

The audio profile generation module 204 is configured to receive an audio signal from the audio reception module 202 and to generate an intended-audio profile or an unintended-audio profile from the audio signal. In various embodiments, one or more artificial intelligence mechanisms or machine learning mechanisms may be employed to identify and generate an intended-audio signature of an intended audio from the audio signal or to identify and generate an unintended-audio signature of an unintended audio from the audio signal. Such mechanisms may be trained to detect repetitive sounds (e.g., a mobile phone ringer or fire alarm), audio having a minimum threshold pitch or volume (e.g., a baby crying or fire alarm), preselected words or phrases (e.g., "help" or "I need assistance" or "carbon monoxide detected"), or some other detectable and identifiable audio signal, or some combination thereof.

In various embodiments, the user of the content receiver 122 may be provided with a graphical user interface in which the user can select or define the intended-audio action or the unintended-audio action for audio profile generated for audio signature identified from the audio signal. For example, if the external audio capturing device 220 is a video baby monitor and the identified intended audio is of a baby crying, then the user selects the intended-audio action to have the content receiver 122 overlay the video feed from the baby monitor on the content that is being output to the user via the display device 124. As another example, if the external audio capturing device 220 is a doorbell and the identified intended audio is a doorbell chime, then the user can select the intended-audio action to have the content receiver 122 display a bell icon on the display device 124 and to pause the output of the content. As yet another example, if the audio signal includes untended noise of a loud air conditioner, then the user can select the unintended-audio action to have the content receiver 122 output the content at a higher volume. These examples are for illustration and are not to be limiting. Once an intended audio is identified, the intended-audio signature is generated, and the intended-audio action is selected, the audio profile generation module 204 stores an intended-audio profile for that intended-audio signature and that corresponding intended-audio action in the audio profile database 230. Similarly, once an unintended audio is identified, the unintended-audio signature is generated, and the unintended-audio action is selected, the audio profile generation module 204 stores an unintended-audio profile for that unintended-audio signature and that corresponding unintended-audio action in the audio profile database 230.

Although the audio reception module 202, the audio profile generation module 202, and the audio analysis module 206 are illustrated as being separate modules, embodiments are not so limited. Rather, the functionality of the audio reception module 202, the audio profile generation module 202, and the audio analysis module 206 may be performed by a single module or component, or performed by a plurality of module or components. As described herein, a processor system may be utilized to perform the embodiments of the audio profile generation module 202, the audio reception module 204, and the audio analysis module 206.

Although embodiments are generally described as the content receiver 122 receiving audio signals from one or more audio capturing devices 220, embodiments are not so limited. In some embodiments, other signals or identifiers indicating the presence of audio may be received. For example, the content receiver 122 may receive a signal from a device having one or more buttons, switches, physical interfaces, or graphical user interfaces configured to receive input indicating the presence of audio. As one example, in response to a person pushing a doorbell button, the doorbell may transmit an identifier, data signal, or message to the content receiver 122 such that the audio reception module 202 receives the message of the person pushing the doorbell. The audio analysis module 206 can then determine the intended-audio profile associated with the doorbell and select the corresponding intended-audio action for that profile.

Figure 3:
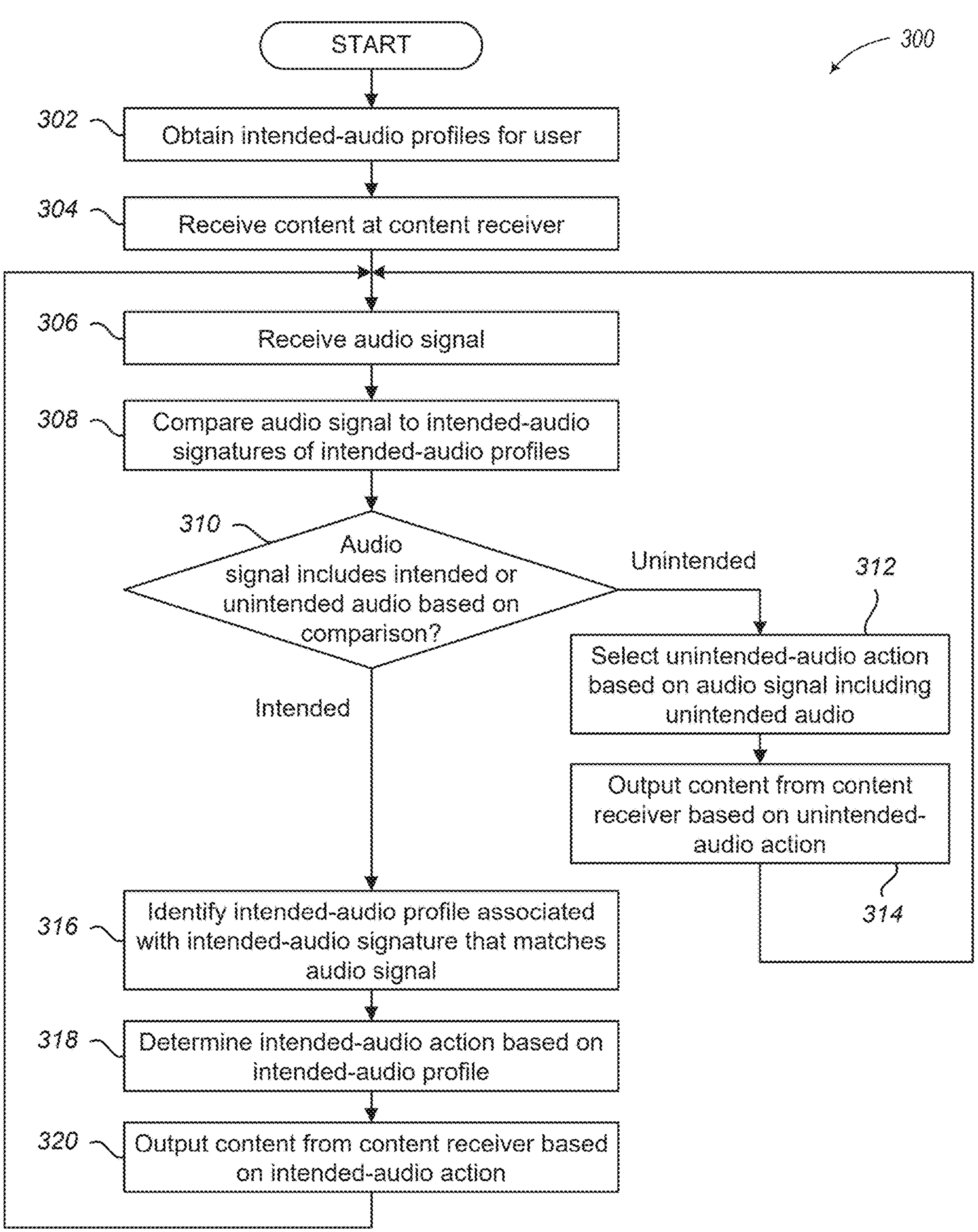
FIG. 3 illustrates a logical flow diagram showing one embodiment of a process for dynamically selecting an action for a content receiver based on receipt of intended or unintended audio in accordance with embodiments described herein.

The operation of certain aspects will now be described with respect to FIG. 3. FIG. 3 illustrates a logical flow diagram showing one embodiment of a process 300 for dynamically selecting an action for a content receiver based on receipt of intended or unintended audio in accordance with embodiments described herein. Process 300 may be implemented by one or more processors or executed via circuitry on one or more computing devices, such as content receiver 122 in FIG. 1.

Process 300 begins, after a start block, at block 302, where a plurality of intended-audio profiles are obtained for a user. As discussed herein, each separate intended-audio profile includes an intended-audio signature representing an intended audio and a corresponding intended-audio action indicating how the content receiver is to respond to identification or detection of the intended audio. In some embodiments, a plurality of users may each have a separate plurality of intended-audio profiles, which may share one or more similar intended-audio profiles and have at least one different intended-audio profile. In this way, the content receiver can identify or detect different intended audio for different users and perform different actions accordingly.

In some embodiments, a plurality of unintended-audio profiles may also be obtained for the user. As discussed herein, each separate unintended-audio profile includes an unintended-audio signature representing an unintended audio and a corresponding unintended-audio action indicating how the content receiver is to respond to identification or detection of the unintended audio. In some embodiments, a plurality of users may each have a separate plurality of unintended-audio profiles, which may share one or more similar unintended-audio profiles and have at least one different unintended-audio profile. In this way, the content receiver can identify or detect different unintended audio for different users and perform different actions accordingly.

The intended-audio profiles, or unintended-audio profiles, may be set by an administrator, selected by the user of the content receiver, defined by the user of the content receiver, learned via one or more artificial intelligence mechanisms, or some combination thereof. For example, an administrator may set one or more intended-audio profiles of doorbells, babies crying, telephones ringing, etc., which may be stored on the content receiver or downloaded during an update of the content receiver. In some embodiments, the user may select one or more intended-audio profiles from a plurality of predefined intended-audio profiles (e.g., selecting the intended-audio profile that matches the ringtone of their telephone). In other embodiments, a training audio signal may be received from an audio capturing device, from which the user can provide input indicating whether the training audio signal includes an intended audio or an unintended audio. If the user input indicates that the training audio signal includes an intended audio, then an intended-audio profile can be generated for that intended audio. In various embodiments, an artificial intelligence model may be trained from a plurality of audio signals to identify or predict intended audios. In this way, a training audio signal may be received from an audio capturing device, and the trained artificial intelligence model can be employed to define an intended-audio profile for the user based on the received training audio signal.

Process 300 proceeds, after block 302, to block 304, where content is received at the content receiver for presentation to the user. The content may be any audiovisual content, video content, or audio content that is to be output, displayed, or otherwise presented to the user of the content receiver, such as via a display device or speaker.

Process 300 continues, after block 304, at block 306, where an audio signal is received. In various embodiments, the audio signal is associated with the user of the content receiver such that the audio signal is analyzed for intended audio in which the user may be interested or unintended audio that may be distracting to the user. As described herein, the audio signal may be received from one or more external audio capturing devices, one or more internal audio capturing devices, or some combination thereof. The audio capturing devices in which to receive the audio signal may be selected or filtered based on the user of the content receiver.

Process 300 proceeds, after block 306, to block 308, where the audio signal is compared to the intended-audio signatures of each intended-audio profile for the user of the content receiver. In some embodiments, the audio waveform of the audio signal is compared to target audio waveforms of the intended-audio signatures. In other embodiments, an identifier, value, or message indicating the presence of audio or noise is compared to the identifiers, values, or messages of the intended-audio signatures.

In some embodiments, the audio signal may also be compared to the unintended-audio signatures of each unintended-audio profile for the user of the content receiver. In some such embodiments, the audio waveform of the audio signal is compared to target audio waveforms of the unintended-audio signatures.

Process 300 continues, after block 308, at decision block 310, where a determination is made whether the audio signal includes an intended audio or an unintended audio based on the comparison between the audio signal and the intended-audio signatures in the intended-audio profiles for the user. An intended audio is identified or detected in the audio signal when there is a match between the audio signal and an intended-audio signature. In some embodiments, an unintended audio is identified or detected when the audio signal includes ambient noise above a threshold value that does not match an intended-audio signature. In other embodiments, an unintended audio is identified or detected in the audio signal when there is a match between the audio signal and an unintended-audio signature. If intended audio is identified, then process 300 flows from decision block 310 to block 316. And if unintended audio is identified, then process 300 flows from decision block 310 to block 312. If no audio is detected, process 300 may loop (not illustrated) to block 306 to continue to receive audio signals from one or more audio capturing devices.

At block 312, an unintended-audio action is selected based on the audio signal including an unintended audio. In some embodiments, one or more unintended-audio actions may be predefined or preselected based on the current actions being performed by the content receiver. In other embodiments, one or more unintended-audio actions may be determined from an unintended-audio profile that includes the unintended-audio signature that matches the audio signal. For example, in some embodiments, the unintended-audio action may be to increase the volume of the content being output by the content receiver. In other embodiments, the unintended-audio action may be to pause the content being output by the content receiver. In various embodiments, the unintended-audio action may be selected based on the volume or intensity of the unintended audio (e.g., increasing the volume of the content being output if the unintended audio is below a threshold value, but pausing the content output if the unintended audio is above the threshold value).

Process 300 proceeds, after block 312, to block 314, where the content is output from the content receiver based on the unintended-audio action. After block 314, process 300 loops to block 306 to continue to receive audio signals from the one or more audio capturing devices.

If, at decision block 310, an intended audio is identified or detected, process 300 flows from decision block 310 to block 316. At block 316, an intended-audio profile associated with the intended-audio signature that matches the audio signal is identified and selected.

Process 300 continues, after block 316, at block 318, where an intended-audio action is determined based on the intended-audio profile identified at block 316. As described herein, each intended-audio profile includes a corresponding intended-audio action, which can be selected or obtained in response to identifying the intended-audio profile associated with the intended-audio signature that matches the audio signal.

Process 300 proceeds, after block 318, to block 320, where the content is output from the content receiver based on the intended-audio action. In some embodiments, the content receiver may select information regarding the intended audio in the audio signal based on the intended-audio action, and then overlay the information on the content that is output to the user. In other embodiments, the content receiver may receive a separate audiovisual signal associated with the intended-audio profile (e.g., a video signal from a webcam or baby monitor) and then combine the separate audiovisual signal with the content for output (e.g., via a display device) to the user. In yet other embodiments, the content receiver may pause the output of the content to a display device. In various other embodiments, the content receiver may output the content via a display device at an increased volume or with closed captioning activated. These examples of intended-audio actions are not to be limiting and other types of intended-audio actions may be selected and employed by the content receiver in response to identification or detection of an intended audio in the audio signal.

After block 320, process 300 loops to block 306 to continue to receive audio signals from one or more audio capturing devices.

Figure 4:
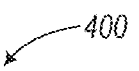
FIG. 4 shows a system diagram that describe various implementations of computing systems for implementing embodiments described herein.
Figure 4:
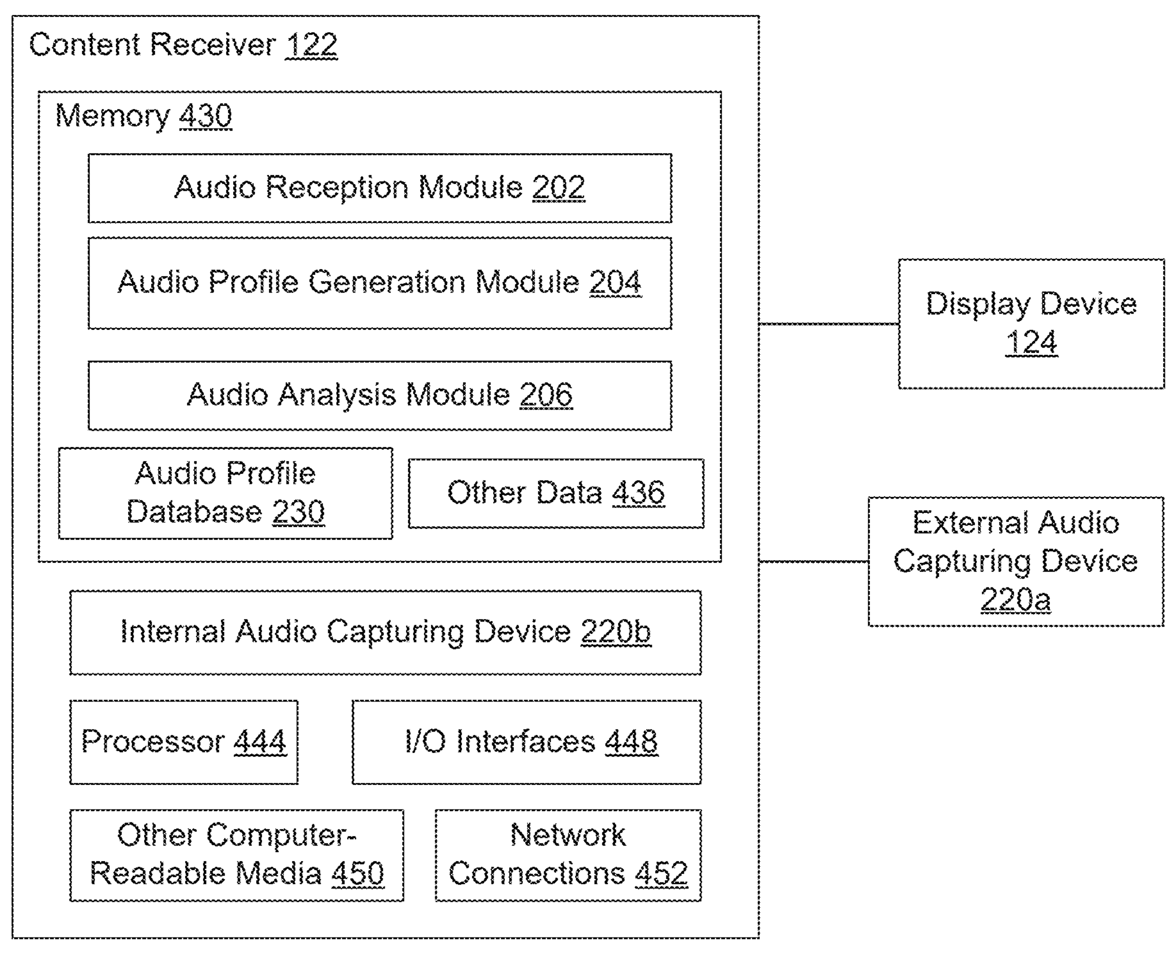

FIG. 4 shows a system diagram that describe various implementations of computing systems for implementing embodiments described herein. System 400 includes content receiver 122 and display device 124. As described herein, in some embodiments, the system 400 may include an optional external audio capturing device 220 configured to capture an audio signal away from the content receiver 122. The external audio capturing device 220 may be a microphone configured to capture an audio signal or some other computing device configured to capture a signal indicating presence of audio or noise.

Content receiver 122 receives content and outputs (or otherwise provides) the content for presentation to a user via display device 124. In general, the content receiver 122 monitors an audio signal captured by one or more audio capturing devices (e.g., external audio capturing device 220*a* or internal audio capturing device 220*b*) for an intended audio or an untended audio. If an intended audio is identified in the audio signal, then the content receiver 122 outputs the content based on an intended-audio action that corresponds to that intended audio. But if unintended audio is identified in the audio signal, then the content receiver 122 outputs the content based on an unintended-audio action, as described herein.

One or more special-purpose computing systems may be used to implement content receiver 122. Accordingly, various embodiments described herein may be implemented in software, hardware, firmware, or in some combination thereof. Content receiver 122 may include memory 430, processor 444, I/O interfaces 448, other computer-readable media 450, and network connections 452. As described herein, in some embodiments, the content receiver 122 may include an optional internal audio capturing device **220*b* configured to capture audio signals from the content receiver 122**.

Memory 430 may include one or more various types of non-volatile and/or volatile storage technologies. Examples of memory 430 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 430 may be utilized to store information, including computer-readable instructions that are utilized by processor 444 to perform actions, including embodiments described herein.

Processor 444 includes one or more processors, one or more processing units, programmable logic, circuitry, or one or more other computing components that are configured to perform embodiments described herein or to execute computer instructions to perform embodiments described herein. In some embodiments, a processor system of the content receiver 122 may include a single processor 444 that operates individually to perform actions. In other embodiments, a processor system of the content receiver 122 may include a plurality of processors 444 that operate to collectively perform actions, such that one or more processors 444 may operate to perform some, but not all, of such actions. Reference herein to "a processor system" of the content receiver 122 refers to one or more processors 444 that individually or collectively perform actions. And reference herein to "the processor system" of the content receiver 122 refers to 1) a subset or all of the one or more processors 444 comprised by "a processor system" of the content receiver 122 and 2) any combination of the one or more processors 444 comprised by "a processor system" of the content receiver 122 and one or more other processors 444.

Memory 430 may have stored thereon audio reception module 202, audio profile generation module 204, and audio analysis module 206. The audio reception module 202 is configured to receive an audio signal from an audio capturing device 220, as described herein. The audio profile generation module 204 is configured to generate or obtain intended-audio profiles or unintended-audio profiles, as described herein. In some embodiments, the audio profile generation module 204 may utilize a training artificial intelligence model to detect and learn intended-audio profiles or unintended-audio profiles from the audio signals received by the audio reception module 202. The audio analysis module 206 is configured to determine if an audio signal received at the audio reception module 202 includes unintended audio or intended audio (as defined by the intended-audio signatures of the intended-audio profiles or the unintended-audio signatures of the unintended-audio profiles). If the audio signal includes unintended audio, the audio analysis module 206 can output content to the display device 124 in accordance with a previously selected or previously defined unintended-audio action. But if the audio signal includes intended audio, the analysis module 206 can output content to the display device 124 in accordance with an intended-audio action associated with an intended audio profile that corresponds to the intended-audio signature that matches the audio signal. Additional details of the audio reception module 202, the audio profile generation module 204, and the audio analysis module 206 are described herein, including in FIG. 2 and elsewhere.

The memory 430 may also store audio profile database 230 and other data 436. The audio profile database 230 may be a data structure that stores a plurality of intended-audio profiles, a plurality of unintended-audio profiles, or some combination thereof, for one or more users of the content receiver 122. In various embodiments, each intended-audio profile stores an intended-audio signature and a corresponding intended-audio action, and each unintended-audio profile stores an unintended-audio signature and a corresponding unintended-audio action. The other data 436 may store programs, operating systems, or other information or data.

Network connections 452 are configured to communicate with other computing devices, such as display device 124 or external audio capturing device **220*a*. I/O interfaces 448 may include a keyboard, audio interfaces, video interfaces, or the like. Other computer-readable media 450** may include other types of stationary or removable computer-readable media, such as removable flash drives, external hard drives, or the like.

The display device 124 may include computing components similar to content receiver 122 or include circuitry to perform similar functionality, but they are not shown in FIG. 4.

The following is a summarization of the claims as originally filed.

A method performed by a content receiver may be summarized as including: receiving content for presentation to a user of the content receiver; receiving an audio signal; determining whether the audio signal includes intended audio or unintended audio based on a comparison between the audio signal and intended-audio signatures of a plurality of intended-audio profiles; in response to determining that the audio signal includes unintended audio, outputting the content based on an unintended-audio action; and in response to determining that the audio signal includes intended audio: determining an intended-audio profile from the plurality of intended-audio profiles that includes an intended-audio signature that matches the audio signal; determining an intended-audio action based on the determined intended-audio profile; and outputting the content based on the intended-audio action.

The method may determine whether the audio signal includes intended audio or unintended audio including: determining that the audio signal includes unintended audio in response to failing to identify a match between the audio signal and the intended audio signatures of the plurality of intended-audio profiles.

The method may determine whether the audio signal includes intended audio or unintended audio including: determining that the audio signal includes unintended audio in response to identifying a match between the audio signal and an unintended audio signature of plurality of unintended-audio profiles.

The method may determine whether the audio signal includes intended audio or unintended audio including: determining that the audio signal includes intended audio in response to identifying a match between the audio signal and the intended audio signature of the intended-audio profile in the plurality of intended-audio profiles.

The method may receive the audio signal including: receiving the audio signal from an internal audio capturing device that is attached to the content receiver.

The method may receive the audio signal including: receiving the audio signal from an external audio capturing device that separate from the content receiver.

The method may output the content based on the unintended-audio action including: outputting the content to a display device for presentation at an increased volume.

The method may output the content based on the intended-audio action including: selecting information regarding an intended audio in the audio signal based on the intended-audio action; overlaying the information on the content; and outputting the content with the overlayed information to a display device for presentation to the user.

The method may output the content based on the intended-audio action including: receiving a separate audiovisual signal associated with the intended-audio profile; combining the separate audiovisual signal with the content; and outputting the combined content to a display device for presentation to the user.

The method may output the content based on the intended-audio action including: pausing the output of the content to a display device.

The method may output the content based on the intended-audio action including: outputting the content to a display device for presentation at an increased volume.

The method may output the content based on the intended-audio action including: outputting the content to a display device for presentation at a muted volume.

The method may further comprise: receiving a training audio signal; receiving user input indicating that the training audio signal include an intended audio; and defining a new intended-audio profile for the plurality of intended-audio profiles based on the intended audio indicated by the user input.

The method may further comprise: receiving a training audio signal; and employing a trained artificial intelligence model to define a new intended-audio profile for the plurality of intended-audio profiles from the training audio signal.

A content receiver may be summarized as comprising: a memory configured to store computer instructions; and a processor system configured to execute the computer instructions to: receive content for presentation to a user of the content receiver; receive an audio signal; compare the audio signal to a plurality of intended-audio signatures; determine whether the audio signal includes intended audio or unintended audio based on the comparison, including: determine that the audio signal includes unintended audio in response to failing to identify a match between the audio signal and the plurality of intended-audio signatures; and determine that the audio signal includes intended audio in response to identifying a match between the audio signal and an intended-audio signature. In response to determining that the audio signal includes unintended audio, the content receiver may output the content based on an unintended-audio action. And in response to determining that the audio signal includes intended audio, the content receiver may: determine an intended-audio action that corresponds to the intended-audio signature that matches the audio signal; and output the content based on the intended-audio action.

The processor system of the content receiver may receive the audio signal by being configured to execute the computer instructions to: receive the audio signal from an external audio capturing device that is remote from the content receiver.

The processor system of the content receiver may output the content based on the unintended-audio action by being configured to execute the computer instructions to: output the content to a display device for presentation at an increased volume.

The processor system of the content receiver may output the content based on the intended-audio action by being configured to execute the computer instructions to: select information regarding an intended audio in the audio signal based on the intended-audio action; overlay the information on the content; and output the content with the overlayed information to a display device for presentation to the user.

The processor system of the content receiver may output the content based on the intended-audio action by being configured to execute the computer instructions to: receive a separate audiovisual signal associated with an intended-audio profile of the intended-audio action; combine the separate audiovisual signal with the content; and output the combined content to a display device for presentation to the user.

A system may be summarized as comprising: an audio capturing device and a content receiver. The audio capturing device may be configured to capture an audio signal. And the content receiver may comprise: a memory configured to store computer instructions, a plurality of intended-audio profiles, and a plurality of unintended-audio profiles; and a processor system configured to execute the computer instructions to: receive content for presentation to a user of the content receiver; determine whether the audio signal includes intended audio or unintended audio based on a comparison between the audio signal and the plurality of intended-audio profiles and the plurality of unintended-audio profiles, including: determine that the audio signal includes unintended audio in response to identifying a match between the audio signal and an unintended-audio profile the plurality of unintended-audio profiles; and determine that the audio signal includes intended audio in response to identifying a match between the audio signal and the intended-audio profile in the plurality of intended-audio profiles. In response to determining that the audio signal includes unintended audio, the content receiver may output the content based on an unintended-audio action. And in response to determining that the audio signal includes intended audio, output the content based on an intended-audio action.

The various embodiments described above can be combined to provide further embodiments. These and other changes can be made to the embodiments in light of the above-detailed description. All of the U.S. patents, U.S. patent application publications, U.S. patent applications, foreign patents, foreign patent applications and non-patent publications listed in the Application Data Sheet are incorporated by reference, in their entirety. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

receiving, by a content receiver, content for presentation to a user of the content receiver;

receiving, by the content receiver, an audio signal;

in response to receiving the audio signal, prompting, by the content receiver, a user to select a learning mode;

in response to the user selecting the learning mode:

employing, by the content receiver, a trained artificial intelligence mechanism to identify the audio signal as intended audio or unintended audio;

in response to identifying the audio signal as intended audio, generating, by the content receiver, an intended-audio signature for the audio signal generating an audio;

generating, by the content receiver, an intended-audio profile for the audio signal; and modifying, by the content receiver, a plurality of intended-audio profiles to included the generated intended-audio profile;

in response to the user failing to select the learning mode:

determining, by the content receiver, whether the audio signal includes intended audio or unintended audio based on a comparison between the audio signal and intended-audio signatures of the plurality of intended-audio profiles;

in response to determining that the audio signal includes unintended audio, outputting, by the content receiver, the content based on an unintended-audio action; and in response to determining that the audio signal includes intended audio:

determining, by the content receiver, an intended-audio profile from the plurality of intended-audio profiles that includes an intended-audio signature that matches the audio signal;

determining, by the content receiver, an intended-audio action based on the determined intended-audio profile; and outputting, by the content receiver, the content based on the intended-audio action.

2. The method of claim 1, wherein determining whether the audio signal includes intended audio or unintended audio includes:

determining, by the content receiver, that the audio signal includes unintended audio in response to failing to identify a match between the audio signal and the intended audio signatures of the plurality of intended-audio profiles.

3. The method of claim 1, wherein determining whether the audio signal includes intended audio or unintended audio includes:

determining, by the content receiver, that the audio signal includes unintended audio in response to identifying a match between the audio signal and an unintended audio signature of plurality of unintended-audio profiles.

4. The method of claim 1, wherein determining whether the audio signal includes intended audio or unintended audio includes:

determining, by the content receiver, that the audio signal includes intended audio in response to identifying a match between the audio signal and the intended audio signature of the intended-audio profile in the plurality of intended-audio profiles.

5. The method of claim 1, wherein receiving the audio signal includes:

receiving, by the content receiver, the audio signal from an internal audio capturing device that is attached to the content receiver.

6. The method of claim 1, wherein receiving the audio signal includes:

receiving, by the content receiver, the audio signal from an external audio capturing device that separate from the content receiver.

7. The method of claim 1, wherein outputting the content based on the unintended-audio action includes:

outputting, by the content receiver, the content to a display device for presentation at an increased volume.

8. The method of claim 1, wherein outputting the content based on the intended-audio action includes:

selecting, by the content receiver, information regarding an intended audio in the audio signal based on the intended-audio action;

overlaying, by the content receiver, the information on the content; and outputting, by the content receiver, the content with the overlayed information to a display device for presentation to the user.

9. The method of claim 1, wherein outputting the content based on the intended-audio action includes:

receiving, by the content receiver, a separate audiovisual signal associated with the intended-audio profile;

combining, by the content receiver, the separate audiovisual signal with the content; and outputting, by the content receiver, the combined content to a display device for presentation to the user.

10. The method of claim 1, wherein outputting the content based on the intended-audio action includes:

pausing, by the content receiver, the output of the content to a display device.

11. The method of claim 1, wherein outputting the content based on the intended-audio action includes:

outputting, by the content receiver, the content to a display device for presentation at an increased volume.

12. The method of claim 1, wherein outputting the content based on the intended-audio action includes:

outputting, by the content receiver, the content to a display device for presentation at a muted volume.

13. The method of claim 1, further comprising:

receiving, by the content receiver, a training audio signal;

receiving, by the content receiver, user input indicating that the training audio signal include an intended audio; and defining, by the content receiver, a new intended-audio profile for the plurality of intended-audio profiles based on the intended audio indicated by the user input.

14. The method of claim 1, further comprising:

receiving, by the content receiver, a training audio signal; and employing, by the content receiver, a trained artificial intelligence model to define a new intended-audio profile for the plurality of intended-audio profiles from the training audio signal.

15. A content receiver, comprising:

a memory configured to store computer instructions and to store a plurality of intended-audio signatures and corresponding intended-audio actions; and a processor system configured to execute the computer instructions to:

receive content for presentation to a user of the content receiver;

receive a first audio signal;

prompt a user to identify the first audio signal as intended audio or unintended audio;

in response to the audio signal being identified as intended audio:

generate an intended-audio signature for the first audio signal;

prompt a user to select an intended-audio action for the generated intended-audio signature; and store the generated intended-audio signature and corresponding user-selected intended-audio action in the memory;

receive a second audio signal;

compare the second audio signal to a plurality of intended-audio signatures;

determine whether the second audio signal includes intended audio or unintended audio based on the comparison, including:

determine that the second audio signal includes unintended audio in response to failing to identify a match between the second audio signal and the plurality of intended-audio signatures; and determine that the second audio signal includes intended audio in response to identifying a match between the second audio signal and an intended-audio signature;

in response to determining that the second audio signal includes unintended audio, output the content based on an unintended-audio action; and in response to determining that the second audio signal includes intended audio:

determine an intended-audio action that corresponds to the intended-audio signature that matches the second audio signal; and output the content based on the intended-audio action.

16. The content receiver of claim 15, wherein the processor system receives the second audio signal by being configured to execute the computer instructions to:

receive the second audio signal from an external audio capturing device that is remote from the content receiver.

17. The content receiver of claim 15, wherein the processor system outputs the content based on the unintended-audio action by being configured to execute the computer instructions to:

output the content to a display device for presentation at an increased volume.

18. The content receiver of claim 15, wherein the processor system outputs the content based on the intended-audio action by being configured to execute the computer instructions to:

select information regarding an intended audio in the second audio signal based on the intended-audio action;

overlay the information on the content; and output the content with the overlayed information to a display device for presentation to the user.

19. The content receiver of claim 15, wherein the processor system outputs the content based on the intended-audio action by being configured to execute the computer instructions to:

receive a separate audiovisual signal associated with an intended-audio profile of the intended-audio action;

combine the separate audiovisual signal with the content; and output the combined content to a display device for presentation to the user.

20. A system, comprising:

a first audio capturing device configured to capture a first audio signal;

a second audio capturing device configured to capture a second audio signal; and a content receiver, comprising:

a memory configured to store computer instructions, a plurality of intended-audio profiles, a plurality of unintended-audio profiles; and a processor system configured to execute the computer instructions to:

receive content for presentation to a user of the content receiver;

in response to capturing the first audio signal and the second audio signal, identify the first audio signal as a prioritized audio signal over the second audio signal;

determine whether the prioritized audio signal includes intended audio or unintended audio based on a comparison between the prioritized audio signal and the plurality of intended-audio profiles and the plurality of unintended-audio profiles, including:

determine that the prioritized audio signal includes unintended audio in response to identifying a match between the prioritized audio signal an unintended-audio profile in the plurality of unintended-audio profiles; and determine that the prioritized audio signal includes intended audio in response to identifying a match between the prioritized audio signal and an intended-audio profile in the plurality of intended-audio profiles;

in response to determining that the prioritized audio signal includes unintended audio, output the content based on an unintended-audio action; and in response to determining that the prioritized audio signal includes intended audio, output the content based on an intended-audio action.

* * * * *